(No Model.)
H. HIRSCHING.
REDUCTION OF ORES.
No. 365,746. Patented June 28, 1887.
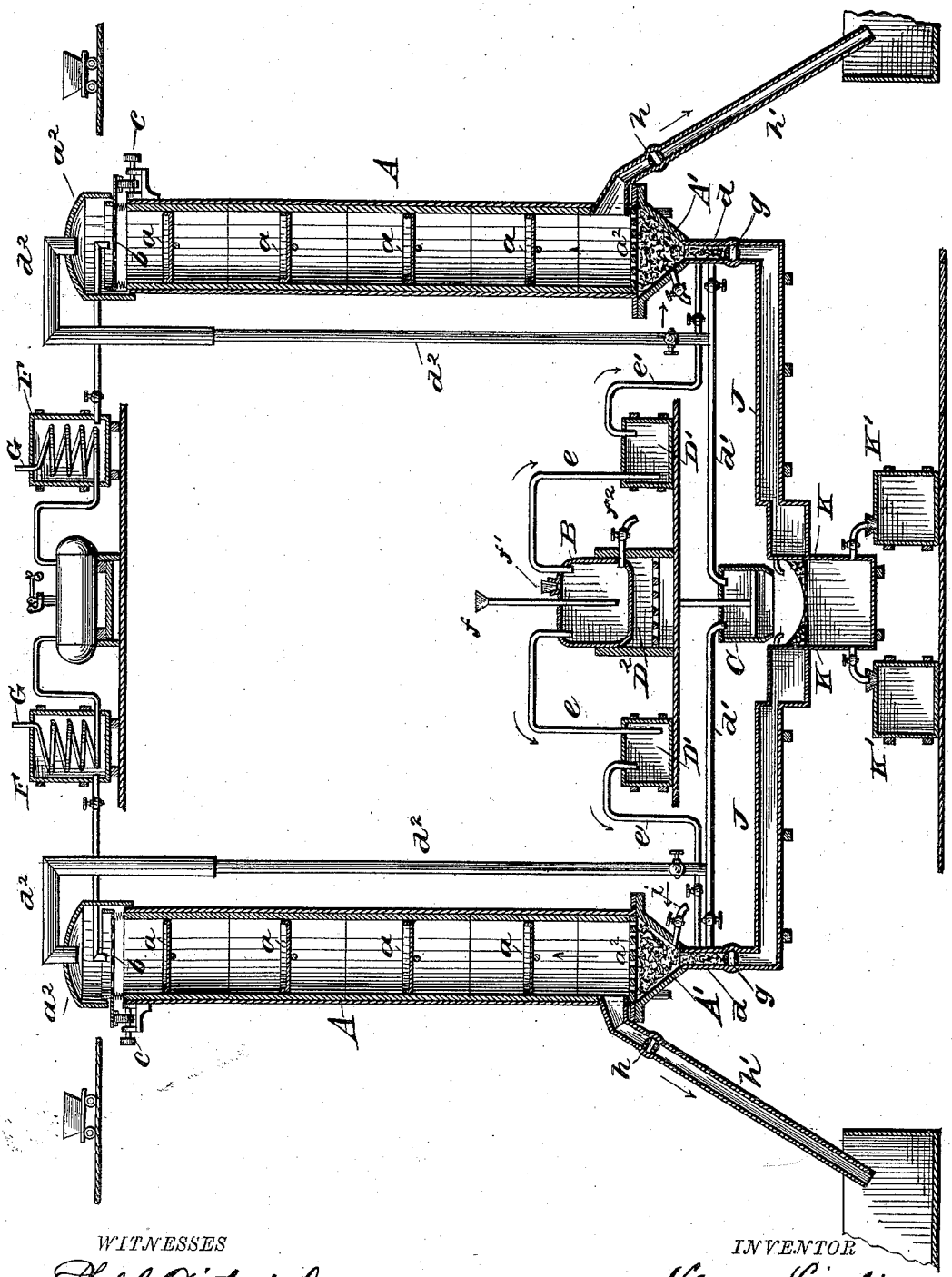
WITNESSES
Phil C. Dieterich
Thorne S. Walling
INVENTOR
Henry Hirsching
By Ernest C. Webb
his Attorney

UNITED STATES PATENT OFFICE.

HENRY HIRSCHING, OF SALT LAKE CITY, UTAH TERRITORY, ASSIGNOR OF ONE-HALF TO ALEXANDER WIEDRINGHAUS AND FRANZ JUNGK, BOTH OF SAME PLACE.

REDUCTION OF ORES.

SPECIFICATION forming part of Letters Patent No. 365,746, dated June 28, 1887.

Application filed January 10, 1887. Serial No. 223,849. (No model.)

*To all whom it may concern:*

Be it known that I, HENRY HIRSCHING, a citizen of the United States, residing at Salt Lake City, in the county of Salt Lake and Territory of Utah, have invented certain new and useful Improvements in the Reduction of Ores, of which the following is a full, clear, and exact description.

My invention relates to a process and means for separating gold, silver, lead, and copper from the mineral gangue with which these metals are found, which will be fully understood from the following description, when taken in connection with the annexed drawing, in which the figure represents a vertical section through the major portion of a double plant adapted for conducting my improved process.

Before describing my invention, I will state that I am aware that it is not broadly new to employ a process of chloridization in the separation of metals from the gangue with which they are found, or to separate or purify metals, such as gold and silver, from the mineral impurities.

My object is to intimately combine chlorine gas with reduced ore containing metals which it is desired to separate from the mineral portions, thereby forming chlorides or such salts as can be freely disassociated from the metals by heat, leaving the metal practically pure.

In carrying out my improved process I employ an apparatus or plant which I have illustrated in the annexed drawing, which is a vertical section through my improved apparatus, and which I will now describe, referring to said drawing by letters.

The plant proper consists of one or more cylinders, A, one or more chlorine-gas generators, B, an exhausting-engine, C, a pump, an ore-crusher, rollers, a water-tank, settlers, a precipitating apparatus, and a calcination and refining furnace.

I have represented in the annexed drawing two vertical cylinders, A A'. I shall in the following description explain a single apparatus, although I have shown means for duplicating the process.

The capacity of the vertical cylinder A may be, say, twenty tons, more or less. It may consist of boiler-iron lined with clay, bricks, or other suitable material and painted with soluble glass or other coating adapted for the purpose I have in view.

At suitable distances apart in the cylinder A, I employ metal rectangular frames $a$, adapted to serve as stays and keys. In localities where good clay can be economically employed I use as a lining cylinders of this material of about two feet in diameter and two feet long, prepared similar to sewer-pipes, suitably joined, and between the joints I employ the stay rods or frames $a$, above referred to.

At the lower end of the cylinder A is an inverted cone, A', preferably of cast-iron, which may be flanged and united by bolts to the lower flanged shell of the cylinder A, so that the former can be readily removed when desired and a new one substituted. This inverted cone A' is what I denominate the "filter," and will be hereinafter again referred to.

The upper end of the cylinder A or charge-opening is covered by a movable sieve, $b$, which preferably rests upon springs. The shaking of this sieve is effected by an eccentric or knocker, $c$, which may be actuated by suitable connections with an engine. (Not shown in the drawing.) Instead of using this sieve $b$, a perforated revolving horizontal cylinder may be employed and located on top of the cylinder A, and provided with a funnel for conducting the charges of hot roasted ore into it. If such a perforated cylinder is employed, it should be provided with a door to receive the charges from the funnel, and also with means for rotating it.

To the lower end of the vertical cylinder A I apply an exhausting apparatus, C, connected to the outlet-pipe $d$ of the funnel A' by a pipe, $d'$, and, if found desirable, this exhauster C may be connected by a pipe, $d^2$, to the apex of a movable cover, $A^2$, applied to the top of the cylinder A, to which pipes one or more regulating-cocks should be applied, as shown in the drawing. This exhauster C is set in operation when the wash-water ceases to pass through the ore in cylinder A, which operation is continued for a short time only.

The funnel A' is filled with coarse quartz, upon which rests a perforated diaphragm, $a^2$, of clay or cast-iron.

The chlorine-gas-generating apparatus consists of the vessel B, made of clay or of cast-iron lined with sheet-lead. This vessel is provided with a lead pipe, $e$, leading to a hermetical "Woulf" tank, D', where the gas is washed and the water highly charged with chlorine gas. From the tank D' a lead pipe, $e'$, provided with a cock, conducts the gas into the pipe leading from the funnel A' at the lower end of the cylinder A. Thus the chlorine gas is compelled to pass from the lower end of this cylinder upward through the entire body of the ore therein, regulated by the cock in said pipe $e'$.

If desirable, the chlorine gas may be introduced into the top of the cylinder A, and by means of the exhauster above described the gas is forced through the entire body of ore in said cylinder from above downward, which I consider practically the equivalent of forcing the gas upward through the ore.

The vessel B is provided with a funnel, $f$, for supplying it with sulphuric acid and water to mix with the black oxide of manganese and chloride of sodium (salt) to form chlorine gas, and on one side of the funnel-aperture is another aperture, $f'$, for the funnel, both of which apertures should be closed while generating the gas. A discharge-cock, $f^2$, is also applied to the vessel B. This vessel is mounted on a furnace, $D^2$, which may be heated with gas or other suitable fuel, depending upon the capacity of the cylinder A for containing ore and the facilities at hand for conducting the process.

The gas generating and exhausting apparatus may be located upon a lower or an upper floor, as circumstances may require.

On the upper floor or level, E, I locate the boiler, the engine, the pump, and water-tanks. The tank F is provided with a pipe-coil, G, which is connected with the boiler H, so that by passing steam through the coil hot water can be obtained.

On the floor E, I locate tanks for containing the hyposulphide-of-sodium solution and the calcination-furnace, which are connected by a track or a direct sheet-iron flume with the charge-opening of the cylinder A.

By means of a flume or pipe, J, provided with a regulating-cock, $g$, the filtered liquor is conducted from the lower end of the filter A' into a series of settlers, K, the last or lowest one, K', of which is used as a precipitation-tank.

When only small quantities of metal are attained, the liquor may be drawn from the filter A' directly into carboys and precipitated by the usual process in the laboratory.

The precipitate is fused in a reverberatory furnace with soda, and the produced bullion is assayed.

When the extraction is complete, the cock or gate $h$ is opened and the ore is discharged from the cylinder A by means of a chute, $h'$, facilitated by a stream of water. The cylinder is then ready for another charge and repetition of the process.

It will be observed from the foregoing that the ore is chloridized, leached, and extracted in one and the same cylinder, A, without moving the same.

The improved process is conducted as follows: The cylinder A is charged gradually with calcined ore immediately after it is taken from the calcinating or roasting furnace, and the temperature of the roasted ore should not exceed 850° Celsius. All compounds of silver are decomposed at this temperature, and when they are brought in contact with chlorine gas the silver is rapidly converted into chloride of silver. The temperature should be regulated according to the heat which is found necessary to decompose the ore. Before charging the cylinder A with ore the chlorine-gas apparatus is set in operation and the said cylinder is filled with this gas, which is freed from the hydrochloric acid by passing it through the Woulf's washing-tank D', as above stated, in which tank chlorine-gas water is produced for subsequent use.

The gas-generating apparatus should be continued in operation and the gas forced in cylinder A until it is fully charged with ore. When all the chlorine gas is absorbed, which can be seen at the top of the cylinder A by the absence of its peculiar color, a second passage of gas may be introduced. A few hours will perform a complete conversion of all the silver into chloride of silver. The lead and copper are also chloridized, but not the gold. About forty gallons of hot water are now poured over the ore in the cylinder A, which will dissolve all the chloridized lead and copper, the liquor being carried off into the proper tank by opening the stop-cock $g$. As soon as the solution begins to cool, the lead crystallizes out; but in order to receive all the lead and copper quickly I may apply the well-known method to separate and precipitate the same. A second washing is now conducted with about a two per cent. of hyposulphite-of-sodium solution. About ten gallons of this solution is now forced over the ore. A few hours' decantation is sufficient to dissolve all the silver chloride. The stop-cock $g$ is kept open, and I wash until no black precipitate occurs upon adding sodium sulphide to a sample taken from the lower end of the cylinder A by sample-cock $i$. The quantity of copper and lead is generally small, for which reason it may be treated directly in the silver-precipitation tank with sodium sulphide, where all the silver is precipitated as sulphide of silver. The other metals will also be precipitated as sulphides. I now pour the produced chlorine-gas water over the ore and decant for a few hours. When there is not enough chlorine-gas water on hand, I pass a current of chlorine gas through the ore and keep it always saturated. This part of the process may be greatly facilitated by using the exhauster above described. All of the gold is now converted into chloride of gold, and the remaining silver, &c., is also chloridized. I now wash with hot water, which takes all the gold in solution, and pass this solution into the gold-precipitation tank and precipitate in the ordinary manner with ferro-sulphate. I now fuse the residuum and assay. The washing of the ore in the cylinder A should now be carried on with hyposulphite-of-sodium solution and hot water until no precipitate ensues on a sample taken from the lower end of the said cylinder, and by using as a test sodium sulphide. All of the received solution should be kept separately and precipitated when large quantities are obtained. The cylinder is now emptied.

If it is advisable to charge the ore before roasting, I use about one per cent. of common salt, (sodium chloride,) in order to hasten the leaching and filtering process.

As a matter of convenience in constructing a plant, I may arrange, say, five cylinders A about a common center equidistant from each other, which arrangement I denominate a "battery." The chlorine-gas apparatus will be located at or near the center of the battery on the lower floor, with the settlers and precipitation-tanks. The other parts of the apparatus are on the upper floor, as illustrated in the annexed drawing.

The cylinders A are about twenty feet in height and about two feet in diameter.

As the whole plant is inexpensive, I rather build more cylinders than to hasten the process. Of course the time occupied depends upon the richness and character of the ore, and will vary somewhat for the different kinds of ore.

I am aware of the existence of apparatus for effecting the reduction of ores somewhat similarly as in the present case, and also of processes wherein like results are accomplished as by my invention; but I am not aware that the particular nature of apparatus or the particular processes herein resorted to have ever heretofore been devised.

Having described my invention, I claim—

1. An improved apparatus for extracting metals from ores, consisting of a vertical vitreous-lined cylinder provided with a filter at its bottom and a sieve and removable cover at its top, a chlorine-gas generator, a purifier for this gas, a pipe forming a communication between the purifier and the said vessel A, an exhausting apparatus and its pipe communicating with said cylinder, and settling or decanting tanks, all substantially as described.

2. The upright cylinder A, for the purpose described, having a vitreous inner surface, in combination with the bottom filter and its perforated diaphragm, the sieve, the removable cover, and the interior braces, and a pipe provided with a regulating-cock leading to settlers, substantially as described.

3. The combination, with the vessel A, having a filtering-bottom, a screen, and a removable cover, of a discharge-chute provided with a cock or gate, a hot-water tank, and a chlorine-gas generator, substantially as described.

In testimony whereof I have hereunto set my hand this 30th day of December, A. D. 1886.

HENRY HIRSCHING.

Witnesses:
WILLIAM C. HALL,
WILLIAM BURKE.